Figure 1:
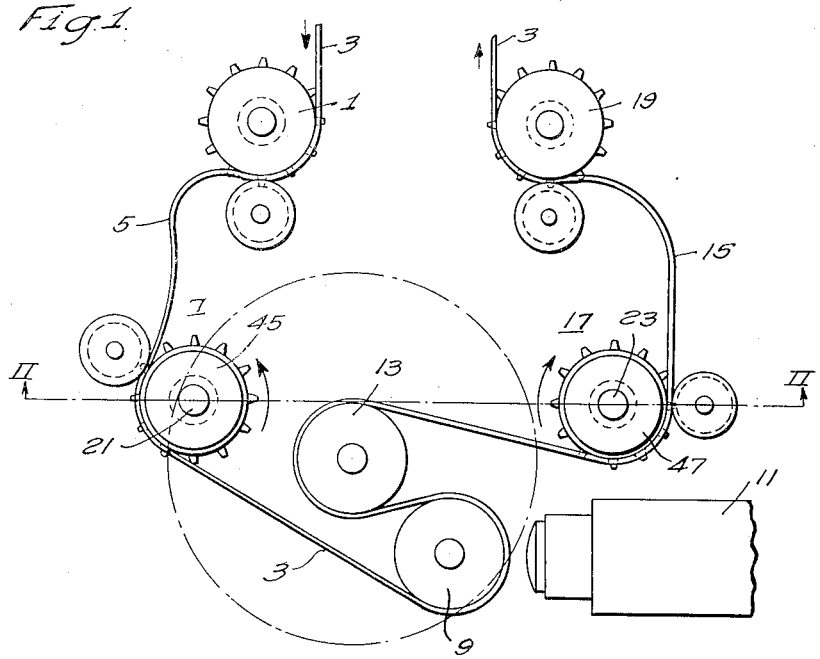

Dec. 18, 1934.  C. R. HANNA  1,985,031

FILM GATE

Original Filed March 24, 1931

WITNESSES:
E. A. McCloskey.
Hymen Diamond

INVENTOR
Clinton R. Hanna
BY F. W. Leyle.
ATTORNEY

Patented Dec. 18, 1934

1,985,031

UNITED STATES PATENT OFFICE 1,985,031

FILM GATE

Clinton R. Hanna, Pittsburgh, Pa., assignor to Westinghouse Electric & Manufacturing Company, East Pittsburgh, Pa., a corporation of Pennsylvania Original application March 24, 1931, Serial No. 524,879. Divided and this application March 29, 1933, Serial No. 663,377

4 Claims. (Cl. 179—100.3)

My invention relates to film gates and has particular relation to apparatus for tensioning a film strip as it is advanced over a film-gate.

The present application is a division of my co-pending application Serial No. 524,879, filed March 24, 1931.

It is an object of my invention to provide for a film gate film tensioning apparatus of a type wherein the frictional forces, exerted on the film shall be a minimum.

Another object of my invention is to provide film-tensioning apparatus, the action of which shall not be dependent upon frictional forces.

A further object of my invention is to provide a shoeless film-gate.

A still further object of my invention is to provide, for film-handling apparatus of the type including a film-supporting surface and a plurality of film-advancing elements, a device for insuring that the film shall firmly and uniformly engage the surface.

Still another object of my invention is to provide film-handling apparatus of a type wherein the film shall be engaged with frictional members on one of its surfaces only.

More concisely stated, it is an object of my invention to provide film-handling apparatus of a type incorporating film-tensioning means, the action of which shall not be dependent upon the frictional forces exerted on the film, and a method for threading the film into the apparatus in such manner as to render the film-tensioning means effective.

According to my invention, I provide a film-tensioning device comprising a plurality of film-advancing mechanisms that are resiliently driven. Before the film is threaded into the apparatus, the resilient mountings of the film-tensioning mechanisms are so stressed that their restoring forces exert a force of tension on the film when it is engaged by the mechanisms.

In the specific embodiment of my invention that will be described herein, the film-handling apparatus takes the form of a sound-recording system. The film is advanced by a resiliently mounted sprocket wheel, into a region where it passes over a film-supporting roller. It is advanced out of the region by a second sprocket wheel that is also resiliently mounted.

The resiliently mounted sprocket wheels and the film-supporting rollers may be regarded as the film-tensioning devices. Immediately before the film is threaded over the sprocket wheels and over the film-supporting roller, the sprocket wheels are twisted in such direction that the film, when in engagement therewith, will be tensioned. In the present embodiment of my invention, the sprocket wheels are twisted in such manner that the restoring forces of their resilient mountings are in an outward direction relative to their line of centers.

Figure 2:
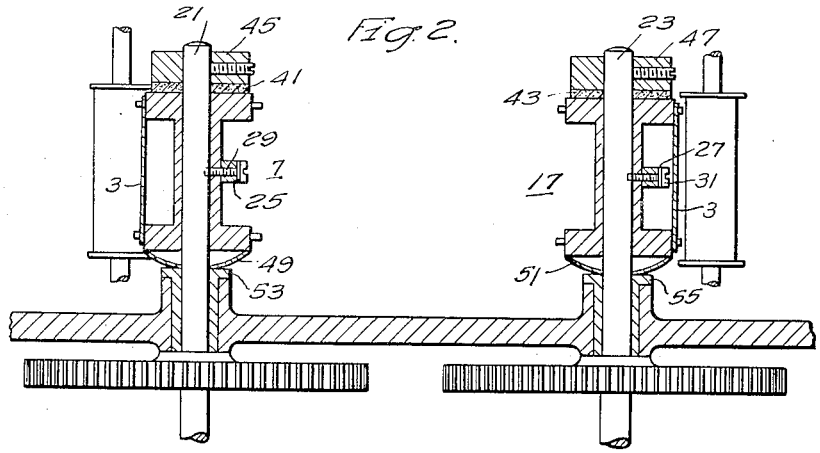
Figure 3:
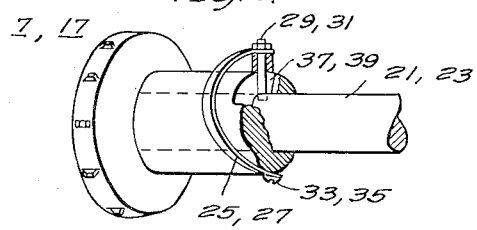

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which Figure 1 is a view, in front elevation, showing the essential elements of a sound-recording device constructed according to my invention;

Fig. 2 is a view, in section, taken along the line II—II of Fig. 1, with the elements that are unnecessary for purposes of explanation omitted, and Fig. 3 is a view, partly in perspective and partly in section, showing a sprocket wheel and a portion of its shaft of the type utilized in the practice of my invention.

The apparatus shown in the drawing comprises a film-feeding roller 1 whereby a film 3 is fed from a reel, or from a camera (not shown), as the case may be, into a loop reservoir 5. The film 3 is then advanced by a resiliently mounted sprocket wheel 7 and passes over a film-supporting roller 9 whereon it presents a uniform surface to the light beam from a sound-recording optical system 11.

After passing over the film-supporting roller 9, the film 3 is engaged by an inertial roller 13 and is advanced into a second loop reservoir 15 by a second resiliently mounted sprocket wheel 17.

From the loop reservoir 15, the film is advanced by a sprocket wheel 19 to a take-up reel or to a photographic camera (not shown), depending upon the particular structure of the apparatus with which my improved film-tensioning device is associated.

The resiliently mounted film-advancing mechanisms 7 and 17 are illustrated in detail in Fig. 2. The rollers 7 and 17 are co-axially supported on a plurality of driven shafts 21 and 23 and may be driven, in any well known manner, from a prime mover (not shown).

The film-advancing mechanisms 7 and 17 are rotatable relative to the driving shafts 21 and 23. However, they are resiliently coupled to the shafts by springs 25 and 27 that are, on the one hand, engaged by pins 29 and 31 secured to the shafts 21 and 23, and, on the other hand, are engaged by pins 33 and 35 secured to the sprocket wheels 7 and 17.

The sprocket wheels 7 and 17 are, furthermore, equipped with suitable slots 37 and 39 whereby they are rendered capable of rotating relative to the pins 29 and 31 secured to the shafts 21 and 23.

To prevent the sprocket wheels from oscillating in their natural period, damping devices are provided for them. The damping devices comprise washers 41 and 43 of suitable damping material, such as felt, preferably lubricated, which are compressed between the sprocket wheels 7 and 17, and metallic washers 45 and 47 secured to the shafts 21 and 23 by springs 49 and 51 to engage bearings 53 and 55, in which the sprocket-wheel shafts are rotated, and the end surfaces of the sprocket wheels.

When being threaded into the apparatus, the film is engaged with one of the sprocket wheels 7 or 17 and is brought adjacent to the other. Before the film is engaged with the second sprocket wheel, the one or the other of the sprocket wheels is twisted in such manner that, after the film is engaged with both sprocket wheels, it is tensioned by the restoring forces of the resilient couplings. The sprocket wheel 7 that feeds the film 3 into the region wherein the sound is impressed thereon is twisted in a counter-clockwise direction, and the sprocket wheel 17 that feeds the film out of this region is twisted in a clockwise direction. When the film is threaded upon the sprocket wheels 7 and 17 and over the rollers 9 and 13 in the region, it is, therefore, in a state of tension by reason of the restoring forces exerted thereon by the resilient members 25 and 27, whereby the sprocket wheels are coupled to the shafts 21 and 23.

The resilient couplings 25 and 27 of the sprocket wheels 7 and 17 enable the latter to adjust their relative movements to the motion of the film 3. The small variations in the angle of twist in the couplings, induced by irregularities in condition of the film strip, do not effect a marked change in the condition of tension of the film, and it continues to move, under tension, through the apparatus, presenting a smooth and uniformly advancing surface to the light beam from the optical system. The resilient couplings also prevent the irregularities of the driving system from appearing in the motion of the film. It will be noted that the combination of the inertial roller 13 and the resiliently mounted sprocket wheels 7 and 17 comprises a mechanical filtering system for a film.

It will be noted that, in the specific embodiment of my invention shown herein, the film-supporting surface 9 is represented as a rotating drum. It may, of course, also be a skid or a fixed plate and in many of the film gates constructed in accordance with my invention is a plate. In particular when my invention is applied to ordinary motion picture projection apparatus the film-supporting surface 9 is replaced by a plane or slightly curved fixed surface over which it is tensioned by the sprocket-wheels 7 and 17.

Furthermore, it is well to note that it lies within the scope of my invention to combine the film-supporting roller and the inertial roller into a single member. At times, however, this condition may be undesirable in view of the structure of the apparatus and, in particular, in view of the fact that it may be desirable to utilize a film-supporting roller of comparatively large diameter, whereas the inertial roller should be of comparatively small diameter in order to be effective.

Moreover, I may point out that, in apparatus including an optical system having a comparatively small angular aperture, and also in apparatus wherein a highly accurate disposition of the surface of the film presented to the optical system, is not required, the film-supporting surface need not be included.

Finally, it is well to add that devices for latching the sprocket wheels 7 and 17 in a tensioned condition during the threading operation may be provided by one skilled in the art. Film-tensioning apparatus, wherein these latching devices are included, are equivalents which lie within the scope of my invention.

Although I have shown and described certain specific embodiments of my invention, I am fully aware that many modifications thereof are possible. My invention, therefore, is not to be restricted, except insofar as is necessitated by the prior art and by the spirit of the appended claims.

I claim as my invention.

1. Film handling apparatus comprising dentate-means to engage a film-strip, means, including a shaft, for rotatably supporting said dentate means, means coupled to said shaft and to said dentate means for impressing an axial resilient torque between said dentate-means and said shaft thereby to impress a tensional force on said film-strip, additional dentate means to engage said film strip, additional means, including a shaft to support said dentate means, means coupled to said last-named shaft and to said dentate means for impressing an axial resilient torque between said last-named dentate-means and said last-named shaft of such direction as to impress a tensional force of opposite polarity to said first-named tensional force on said film-strip and to tension the portion of the film-strip between said two above-named dentate means and means disposed between said two above-named dentate means for impressing a record on said film strip or for reproducing a record impressed on said film strip.

2. Film handling apparatus comprising, dentate-means to engage a film-strip, means, including a shaft, for rotatably supporting said dentate means, means coupled to said shaft and to said dentate means for impressing an axial resilient torque between said dentate-means and said shaft thereby to impress a tensional force on said film-strip, additional dentate means to engage said film strip, additional means, including a shaft to support said dentate means, means coupled to said last-named shaft and to said dentate means for impressing an axial resilient torque between said last-named dentate-means and said last-named shaft of such direction as to impress a tensional force of opposite polarity to said first-named tensional force on said film-strip and to tension the portion of the film-strip between said two above-named dentate means, damping means between each said shaft and its associated dentate means, and means including film-supporting means disposed between said two above-named dentate means for impressing a record on said film strip or for reproducing a record impressed on said film strip.

3. Film handling apparatus comprising a roller adapted to make non-slipping engagement with a film-strip, means, including a shaft, for rotatably supporting said roller, means coupled to said shaft and to said roller for impressing an axial resilient torque between said roller and said shaft thereby to impress a tensional force on said film-strip, a second roller adapted to make non-slipping engagement with said film strip, additional means, including a shaft to support said second roller, means coupled to said last-named shaft and to said second roller for impressing an axial resilient torque between said second roller and said last-named shaft of such direction as to impress a tensional force of opposite polarity to said first-named tensional force on said film-strip and to tension the portion of the film-strip between said two rollers and means including film-supporting means disposed between said two above-named dentate means for impressing a record on said film strip or for reproducing a record impressed on said film strip.

4. Film handling apparatus comprising dentate-means to engage a film-strip, means, including a shaft, for rotatably supporting said dentate means, means coupled to said shaft and to said dentate means for impressing an axial resilient torque between said dentate-means and said shaft thereby to impress a tensional force on said film-strip, additional dentate means to engage said film strip, additional means, including a shaft to support said dentate means, means coupled to said last-named shaft and to said dentate means for impressing an axial resilient torque between said last-named dentate-means and said last-named shaft of such direction as to impress a tensional force of opposite polarity to said first-named tensional force on said film-strip and to tension the portion of the film-strip between said two above-named dentate means and means including an inertial roller to be engaged by the film strip and rotated thereby disposed between said two above-named dentate means for impressing a record on said film strip or for reproducing a record impressed on said film strip.

CLINTON R. HANNA.